United States Patent
Perla et al.

(10) Patent No.: US 12,211,253 B1
(45) Date of Patent: Jan. 28, 2025

(54) SYSTEM AND METHOD OF VISUAL ATTRIBUTE RECOGNITION

(71) Applicant: Blue Yonder Group, Inc., Scottsdale, AZ (US)

(72) Inventors: Ramakrishna Perla, Hyderabad (IN); Arun Raj Parwana Adiraju, Hyderabad (IN); Vineet Chaudhary, Hyderabad (IN)

(73) Assignee: Blue Yonder Group, Inc., Scottsdale, AZ (US)

(*) Notice: Subject to any disclaimer, the term of this patent is extended or adjusted under 35 U.S.C. 154(b) by 107 days.

(21) Appl. No.: 17/240,649

(22) Filed: Apr. 26, 2021

Related U.S. Application Data

(60) Provisional application No. 63/016,939, filed on Apr. 28, 2020.

(51) Int. Cl.
*G06F 18/214* (2023.01)
*G06N 20/20* (2019.01)
(Continued)

(52) U.S. Cl.
CPC ........ *G06V 10/774* (2022.01); *G06F 18/2148* (2023.01); *G06N 20/20* (2019.01); *G06T 3/4046* (2013.01); *G06T 7/0004* (2013.01); *G06T 7/11* (2017.01); *G06V 10/235* (2022.01); *G06V 10/25* (2022.01); *G06V 10/40* (2022.01); *G06V 10/759* (2022.01); *G06V 10/82* (2022.01);
(Continued)

(58) Field of Classification Search
None
See application file for complete search history.

(56) References Cited

U.S. PATENT DOCUMENTS

| | | | |
|---|---|---|---|
| 11,080,562 B1* | 8/2021 | Saxena | G06V 10/451 |
| 2018/0131907 A1* | 5/2018 | Schmirler | H04N 23/698 |

(Continued)

OTHER PUBLICATIONS

Yang H, Tianyi Zhou J, Zhang Y, Gao BB, Wu J, Cai J. Exploit bounding box annotations for multi-label object recognition. InProceedings of the IEEE conference on computer vision and pattern recognition 2016 (pp. 280-288). (Year: 2016).*

(Continued)

*Primary Examiner* — Emily C Terrell
*Assistant Examiner* — Nathan J Bloom
(74) *Attorney, Agent, or Firm* — Spencer Fane LLP; Steven J. Laureanti

(57) ABSTRACT

A system and method of automatic product attribute recognition receive training images having bounding boxes associated with one or more products in the training images, receive attribute values for each of the one or more products in the training images, and train a first convolutional neural network (CNN) model to generate bounding boxes for and identify each of the one or more products with the training images until the accuracy of the first CNN model is above a first predetermined threshold. The system and method further train a second CNN model for each of the products associated with the cropped images until the second CNN generates attribute values for the one or more attributes with an accuracy above a second predetermined threshold, and automatically recognize the one or more attributes for a new product image by presenting the product image to the first and second CNN models.

20 Claims, 10 Drawing Sheets

(51) Int. Cl.
*G06T 3/4046* (2024.01)
*G06T 7/00* (2017.01)
*G06T 7/11* (2017.01)
*G06V 10/22* (2022.01)
*G06V 10/25* (2022.01)
*G06V 10/40* (2022.01)
*G06V 10/75* (2022.01)
*G06V 10/774* (2022.01)
*G06V 10/82* (2022.01)

(52) U.S. Cl.
CPC .............. *G06T 2207/10004* (2013.01); *G06T 2207/20021* (2013.01); *G06T 2207/20092* (2013.01); *G06T 2207/20104* (2013.01); *G06T 2207/30108* (2013.01)

(56) References Cited

U.S. PATENT DOCUMENTS

| | | | | |
|---|---|---|---|---|
| 2019/0325605 A1* | 10/2019 | Ye | .............. | G06F 18/2431 |
| 2020/0117937 A1* | 4/2020 | Lee | .............. | G06T 7/70 |
| 2020/0125888 A1* | 4/2020 | Hacker | .............. | G06N 3/045 |
| 2021/0073977 A1* | 3/2021 | Carter | .............. | G06T 11/20 |
| 2021/0124960 A1* | 4/2021 | Lee | .............. | G06V 10/141 |
| 2021/0125036 A1* | 4/2021 | Tremblay | .............. | G06N 3/045 |
| 2021/0133480 A1* | 5/2021 | Rus | .............. | G06F 18/2413 |
| 2021/0216822 A1* | 7/2021 | Paik | .............. | G06T 7/0012 |

OTHER PUBLICATIONS

Brownlee, J. "Tricks for Configuring Backpropagation to Train Better Neural Networks." Machine Learning Mastery, Aug. 6, 2019 https://machinelearningmastery.com/best-advicefor-configuring-backpropagation-for-deep-learning-neural-networks (Year: 2019).*

Ho Y, Wookey S. The real-world-weight cross-entropy loss function: Modeling the costs of mislabeling. IEEE access. Dec. 27, 2019;8:4806-13. (Year: 2019).*

Ren, Shaoqing, et al. "Faster R-CNN: Towards real-time object detection with region proposal networks." Advances in heural information processing systems. 2015. 9 pages.

Liu, Jingyuan, and Hong Lu. "Deep fashion analysis with feature map upsampling and landmark-driven attention." Proceedings of the European Conference on Computer Vision (ECCV). 2018. 7 pages.

* cited by examiner

SYSTEM AND METHOD OF VISUAL ATTRIBUTE RECOGNITION

CROSS-REFERENCE TO RELATED APPLICATIONS

The present disclosure is related to that disclosed in the U.S. Provisional Application No. 63/016,939, filed Apr. 28, 2020, entitled "System and Method of Visual Attribute Recognition." U.S. Provisional Application No. 63/016,939 is assigned to the assignee of the present application. The subject matter disclosed in U.S. Provisional Application No. 63/016,939 is hereby incorporated by reference into the present disclosure as if fully set forth herein. The present invention hereby claims priority under 35 U.S.C. § 119 (e) to U.S. Provisional Application No. 63/016,939.

TECHNICAL FIELD

The present disclosure relates generally to retail planning and specifically to automatic image-based recognition of products and granular product attributes for retail planning products.

BACKGROUND

Generating a product assortment during retail planning is a mostly manual activity. Identifying apparel and attributes from apparel, although automated to a certain extent, remains a mostly manual activity, as well. Further, even automated apparel and attribute detection systems cannot identify granular attributes or other insights from media. These insights help users to take decision in many planning scenarios. Further, these systems would produce more accurate and useful insights if they are able to interpret multiple data sources. However, current systems require product information like sales, category, attribute, and the like to be entered manually, which cannot scale for large product inventories and real-time scenarios, such as store monitoring. This inability to automatically identify granular attributes from many media types and sources is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
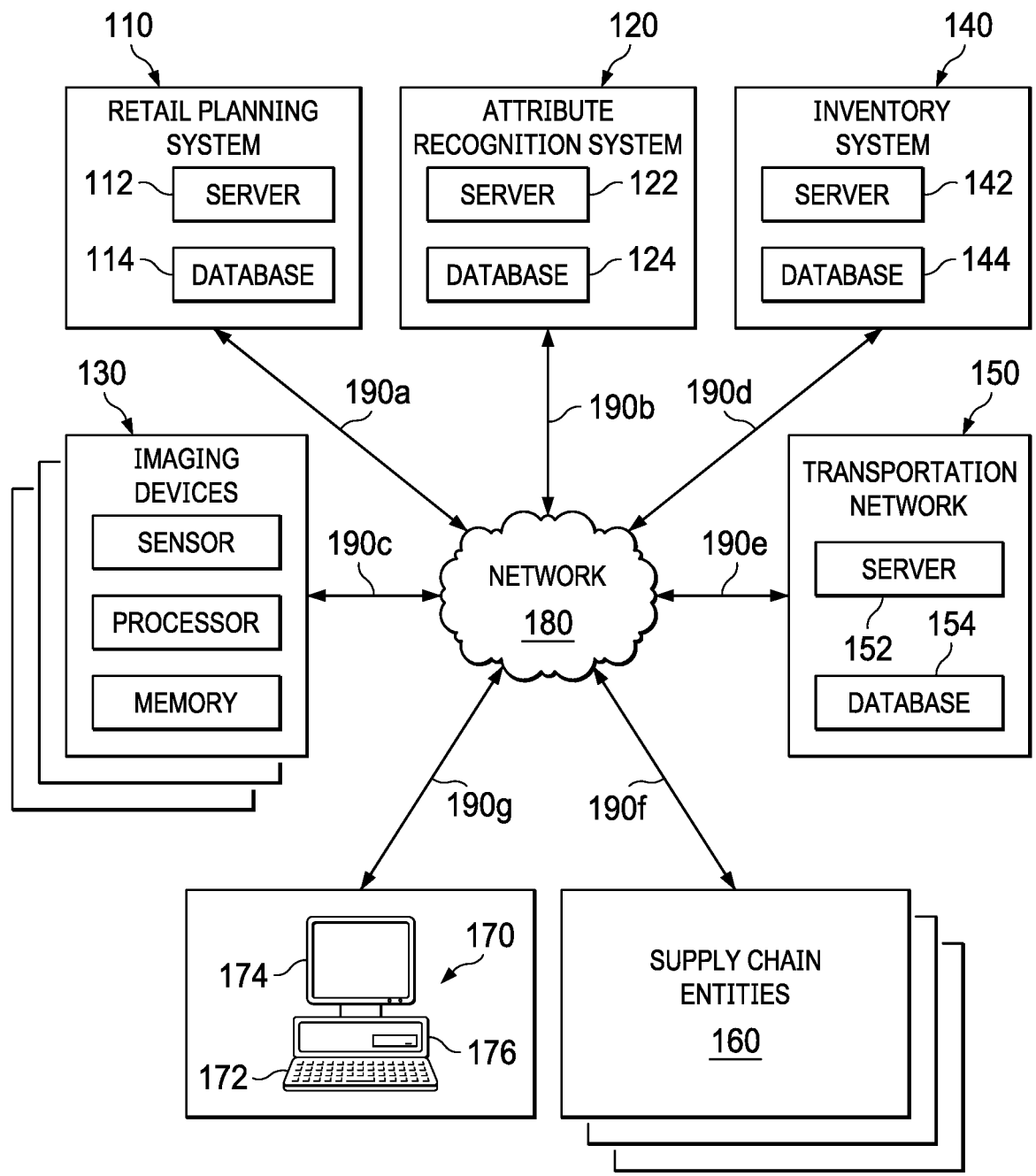
FIG. 1 illustrates a supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, in accordance with a first embodiment. Supply chain network 100 comprises retail planning system 110, attribute recognition system 120, one or more imaging devices 130, inventory system 140, transportation network 150, one or more supply chain entities 160, one or more computers 170, network 180, and communication links 190a-190g. Although a single retail planning system 110, a single attribute recognition system 120, one or more imaging devices 130, a single inventory system 140, a single transportation network 150, one or more supply chain entities 160, one or more computers 170, and a single network 180 are shown and described, embodiments contemplate any suitable number and combination of retail planning systems, attribute recognition systems, imaging devices, inventory systems, transportation networks, supply chain entities, computers, or networks, according to particular needs.

In one embodiment, retail planning system 110 comprises server 112 and database 114. Server 112 comprises one or more modules that use product attributes to compare products, forecast demand, manage and plan assortments, and follow trends. In addition, retail planning system 110 receives, stores, and manages product data 314 (FIG. 2), such as, for example, product images and attributes. Retail planning system 110 represents products by one or more attributes. Attributes comprise attribute types and attribute values. An attribute type is a characteristic that distinguishes one product from another, including, for example, size, weight, dimensions, color, item identifier, style, price, and the like. An attribute type may have one or more possible attribute values. The attribute values indicate which, of the possible attribute values of attribute types, are assigned to a particular product, such as, for example, one or more numerical values (for size, weight, dimensions, price, and binary variables) or one or more descriptive terms, such as, for example, red, blue, green, or yellow (for color), and modern, contemporary, or classic (for style). By way of further explanation only and not of limitation, retail planning system 110 is described in connection with the following example of a clothing retailer. The clothing retailer may sell shirts, shoes, dresses, skirts, socks, purses, suits, and other like apparel. Attributes for the apparel may comprise, for example, gender, season, article of clothing, color, neck style, sleeve-length, pattern, price segment, and the like. Examples of attribute values for these attributes may include, for example, male or female (for gender), spring, summer, fall, or winter (for season), top, blouse, shirt, bottom, pants, shorts, or skirt (for article of clothing), red, blue, green, or yellow (for color), V-neck, off-shoulder, and round (for neck style), three-quarters, short, and full (for sleeve length), striped, solid, or printed (for pattern), and good, better, or best (for price segment). Although particular products comprising particular attributes are described herein, embodiments contemplate any supply chain or retail products being associated with any suitable attributes having any suitable attribute types and attribute values, accordingly to particular needs. Defining attributes for each product may be performed manually, such as, for example, by user input or selection of a type and a value for each attribute of a product. In addition, or as an alternative, attributes may be defined automatically by recognizing the attributes of a product from its image using attribute recognition system 120. Based on tracking the input of attribute information for apparel items, automatic attribute recognition and prepopulating attribute information for one or more apparel items reduces the time consumed up to 80% compared with manual input.

Attribute recognition system 120 comprises server 122 and database 124. According to embodiments, server 122 of attribute recognition system 120 comprises one or more modules that identify granular attributes from one or more media inputs using a deep learning model.

Figure 2:
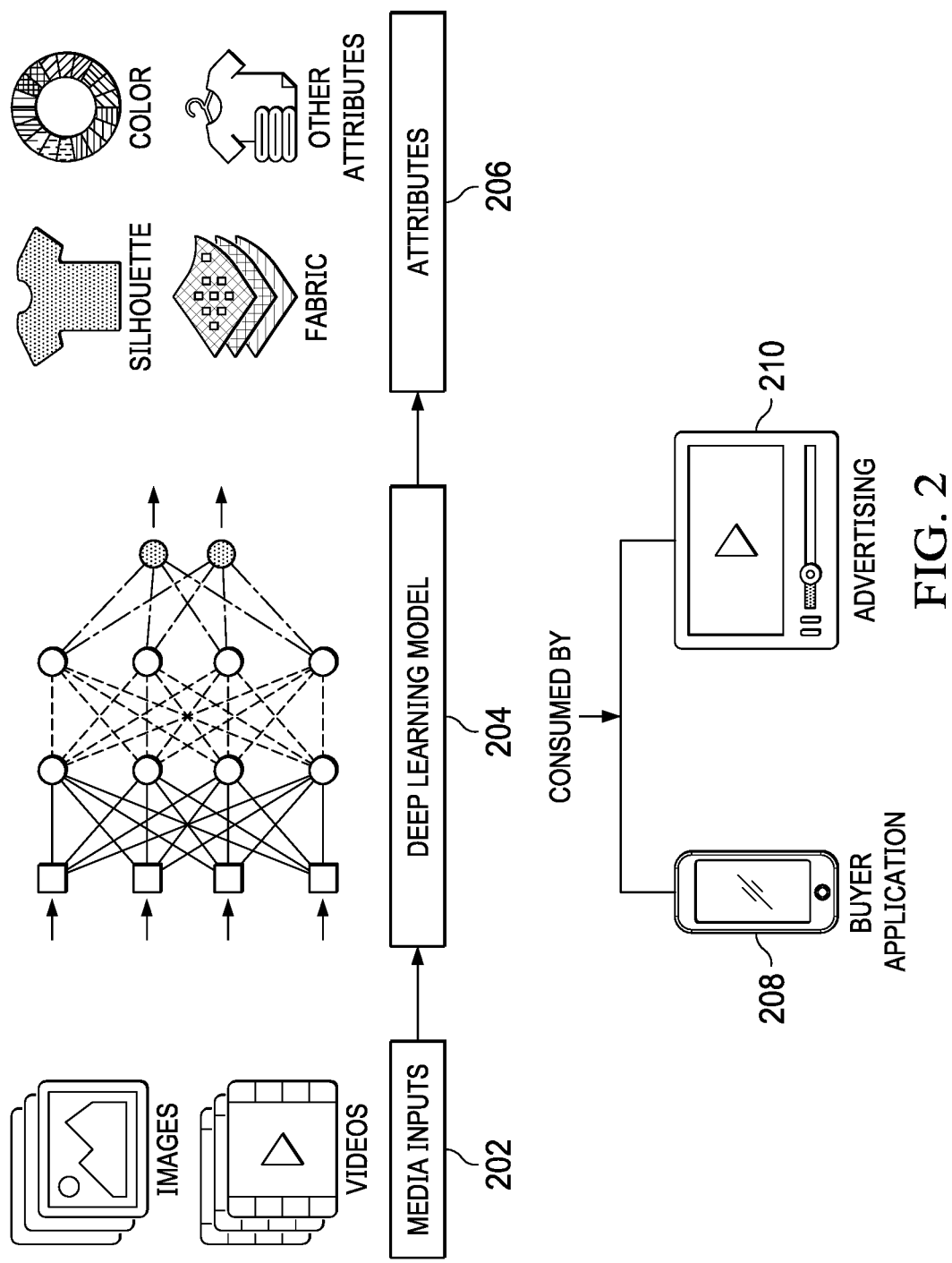
FIG. 2 illustrates an attribute recognition workflow, in accordance with an embodiment.

FIG. 2 illustrates an attribute recognition workflow 200, in accordance with an embodiment. Attribute recognition system 120 receives media 202 showing one or more products of interest to the retailer. Media 202 may comprise, for example, images, videos, or the like, that show products currently sold by the retailer, products planned to be sold by the retailer, trending products, fashion products, or any other products. Media 202 showing the products may be, for example, a video of a runway fashion show, a photograph of a person wearing the product, images of the products received from social media postings (such as, for example, INSTAGRAM, FACEBOOK, and the like), ecommerce websites, television or internet advertisements (such as, for example, YOUTUBE), or any other suitable type of media 202 showing one or more products. As described in further detail below, one or more deep learning models 204 of attribute recognition system 120 are trained to recognize products and product attributes 206 from a set of labeled images 342, and, after training, identify the products from the received media 202, detects granular attributes from the identified products, and transmits, the detected attributes to retail planning system 110, one or more imaging devices 130, or one or more computers 170, the identity of the product and attribute values for various apparel attributes.

As described in further detail below, identified attributes 206 may be transmitted to buyer application 208 or advertising application 210 of one or more imaging devices 130.

One or more imaging devices 130 comprise one or more processors, memory, one or more sensors, and may include any suitable input device, output device, fixed or removable computer-readable storage media, or the like. According to embodiments, one or more imaging devices 130 is a mobile handheld electronic device such as, for example, a smartphone or a tablet computer that transmits images and videos to attribute recognition system 120 and receives, in response, the identified product attributes. Continuing with the previous example of the clothing retailer, one or more imaging devices 130 may comprise buyer application 208. Buyer application 208 is a tool for a buyer of the retailer to create and manage notes, digital visual media, and descriptions of products that may be considered for an upcoming assortment. For example, the buyer uses a smartphone to capture images of models in fashion shows, store descriptions of the products in the captured images, and transmit the descriptions and images to retail planning system 110. According to embodiments, buyer application 208 provides a user interface that, in response to a user selection of an article of apparel or a fashion model in a displayed image or video, automatically identifies apparel and product attributes within the displayed image or video. In addition, one or more imaging devices 130 comprising buyer application 208 generate tables, fields, product descriptions, and the like prepopulated with the identified attribute types and attribute values. For example, one or more imaging devices 130 displays an image of the identified apparel and displays a table prepopulated with the identified attribute values for the neck style, sleeve length, and pattern of the identified apparel.

The one or more sensors of one or more imaging devices 130 may comprise any suitable imaging sensor, such as, for example, a camera, scanner, electronic eye, photodiode, charged coupled device (CCD), or any other electronic component that detects visual characteristics of objects. One or more imaging devices 130 may comprise, for example, a mobile handheld electronic device such as, for example, a smartphone, a tablet computer, a wireless communication device, or any networked electronic devices configured to image items using the one or more sensors and transmit product images to retail planning system 110, attribute recognition system 120, one or more imaging devices 130, inventory system 140, transportation network 150, one or more supply chain entities 160, and/or one or more computers 170. According to an embodiment, one or more imaging devices 130 analyze images of products received from one or more sensors and identify attributes, attribute values, identifiers, or the like. One or more imaging devices 130 may generate a mapping of one or more items in supply chain network 100 by scanning an identifier or object associated with an item and identifying the item based, at least in part, on the scan. This may include, for example, a stationary scanner located at one or more supply chain entities 160 that scans items as the items pass near the scanner.

In addition, or as an alternative, the one or more sensors may comprise a radio receiver and/or transmitter configured to read an electronic tag, such as, for example, a radio-frequency identification (RFID) tag. The one or more sensors of one or more imaging devices 130 may be located at one or more locations local to, or remote from, one or more imaging devices 130, including, for example, the one or more sensors integrated into one or more imaging devices 130 or the one or more sensors remotely located from, but communicatively coupled with, one or more imaging devices 130. According to some embodiments, the one or more sensors of the imaging devices may be configured to communicate directly or indirectly with one or more of retail planning system 110, attribute recognition system 120, one or more imaging devices 130, inventory system 140, transportation network 150, one or more supply chain entities 160, one or more computers 170, and/or network using one or more communication links.

Inventory system 140 comprises server 142 and database 144. Database 144 of inventory system 140 is configured to receive and transmit inventory data, including item identifiers, pricing data, attribute data, inventory levels, and other like data about one or more items at one or more locations in supply chain network 100. Each item may be represented in supply chain network 100 by an identifier, including, for example, Stock-Keeping Unit (SKU), Universal Product Code (UPC), serial number, barcode, tag, RFID, or like objects that encode identifying information. Database 144 stores and retrieves inventory data from database 144 or from one or more locations in supply chain network 100. Inventory system 140 may send current inventory levels to retail planning system 110 and, in response, retail planning system 110 may determine and indicate whether the current inventory levels will be sufficient to meet one or more planned assortments.

Transportation network 150 comprises server 152 and database 154. According to embodiments, transportation network 150 directs one or more transportation vehicles to ship one or more items between one or more supply chain entities 160, based, at least in part, on a sales forecast or an assortment determined by retail planning system 110, the number of items currently in stock at one or more stocking locations of one or more supply chain entities 160, the number of items currently in transit in transportation network 150 and/or one or more other factors described herein. The transportation vehicles comprise, for example, any number of trucks, cars, vans, boats, airplanes, unmanned aerial vehicles (UAVs), cranes, robotic machinery, or the like. The transportation vehicles may comprise radio, satellite, or other communication that communicates location information (such as, for example, geographic coordinates, distance from a location, global positioning satellite (GPS) information, or the like) with retail planning system 110, attribute recognition system 120, inventory system 140, transportation network 150, and/or one or more supply chain entities 160 to identify the location of the transportation vehicle and the location of any inventory or shipment located on the transportation vehicle.

As shown in FIG. 1, supply chain network 100 comprising retail planning system 110, attribute recognition system 120, one or more imaging devices 130, inventory system 140, transportation network 150, and one or more supply chain entities 160 may operate on one or more computers 170 that are integral to or separate from the hardware and/or software that support retail planning system 110, attribute recognition system 120, one or more imaging devices 130, inventory system 140, transportation network 150, and one or more supply chain entities 160. One or more computers 170 may include any suitable input devices 172, such as a keypad, mouse, touch screen, microphone, or other device to input information. Output devices 174 may convey information associated with the operation of supply chain network 100, including digital or analog data, visual information, or audio information. One or more computers 170 may include fixed or removable computer-readable storage media, including a non-transitory computer readable medium, magnetic computer disks, flash drives, CD-ROM, in-memory device or other suitable media to receive output from and provide input to supply chain network 100. One or more computers 170 may include one or more processors 176 and associated memory to execute instructions and manipulate information according to the operation of supply chain network 100 and any of the methods described herein. In addition, or as an alternative, embodiments contemplate executing the instructions on one or more computers that cause one or more computers to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

Retail planning system 110, attribute recognition system 120, one or more imaging devices 130, inventory system 140, transportation network 150, and one or more supply chain entities 160 may each operate on one or more separate computers, a network of one or more separate or collective computers, or may operate on one or more shared computers. In addition, supply chain network 100 may comprise a cloud-based computing system having processing and storage devices at one or more locations, local to, or remote from retail planning system 110, attribute recognition system 120, one or more imaging devices 130, inventory system 140, transportation network 150, and one or more supply chain entities 160. In addition, each of one or more computers 170 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with retail planning system 110, attribute recognition system 120, one or more imaging devices 130, inventory system 140, transportation network 150, and one or more supply chain entities 160.

These one or more users may include, for example, a "manager" or a "planner" handling assortment planning, configuration and operation of retail planning system 110, organizing and tracking attributes, and/or one or more related tasks within supply chain network 100. In addition, or as an alternative, these one or more users within supply chain network 100 may include, for example, one or more computers programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

One or more supply chain entities 160 represents one or more retailers, suppliers, manufacturers, and distribution centers in one or more supply chain networks, which may be included in one or more enterprises. One or more retailers may be any suitable entity that obtains one or more products to sell to one or more customers. In addition to the clothing retailer disclosed above, the one or more retailers may comprise a grocery retailer, a furniture retailer, and a big-box store, or any suitable retailer, according to particular needs. One or more retailers may comprise any online or brick and mortar location, including locations with shelving systems. Shelving systems may comprise, for example, various racks, fixtures, brackets, notches, grooves, slots, or other attachment devices for fixing shelves or display locations in various configurations. These configurations may comprise shelving and display locations with adjustable lengths, heights, and other arrangements, which may be adjusted by an employee of one or more retailers based on computer-generated instructions or automatically by machinery to place products in a desired location in response to, or based at least in part on, a sales forecast, identified like-items, assortments determined by retail planning system 110, and/or product and attribute identification by attribute recognition system 120, the number of items currently in stock or projected to be in stock at one or more stocking location of one or more supply chain entities 160, the number of items currently in transit in transportation network 150, a forecasted demand, a supply chain disruption, a material or capacity reallocation, and/or one or more additional factors described herein.

One or more suppliers may be any suitable entity that offers to sell or otherwise provides one or more components to one or more manufacturers. One or more suppliers may, for example, receive a product from a first supply chain entity in supply chain network 100 and provide the product to another supply chain entity. One or more suppliers may comprise automated distribution systems that automatically transport products to one or more manufacturers. A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products.

One or more distribution centers may be any suitable entity that offers to sell or otherwise distributes at least one product to one or more retailers and/or customers. Distribution centers may, for example, receive a product from a first supply chain entity in supply chain network 100 and store and transport the product for a second supply chain entity. Such distribution centers may comprise automated warehousing systems that automatically transport to one or more retailers or customers and/or automatically remove an item from, or place an item into, inventory in response to, or based at least in part on, a sales forecast, identified like-items, assortments determined by retail planning system 110, and/or product and attribute identification by attribute recognition system 120, the number of items currently in stock or projected to be in stock at one or more stocking location of one or more supply chain entities 160, the number of items currently in transit in transportation network 150, a forecasted demand, a supply chain disruption, a material or capacity reallocation, and/or one or more additional factors described herein.

Although one or more retailers, suppliers, manufacturers, and distribution centers are shown and described as separate and distinct entities, the same entity may simultaneously act as any one or more retailers, suppliers, manufacturers, and distribution centers. For example, one or more manufacturers acting as a manufacturer could produce a product, and the same entity could act as a supplier to supply a product to another supply chain entity. Although one example of a supply chain network is shown and described, embodiments contemplate any configuration of supply chain network 100, without departing from the scope of the present disclosure.

Retail planning system 110 may be coupled with network 180 using a communications link, which may be any wireline, wireless, or other link suitable to support data communications between retail planning system 110 and network 180 during operation of supply chain network 100. Attribute recognition system 120 may be coupled with network 180 using a communications link, which may be any wireline, wireless, or other link suitable to support data communications between attribute recognition system 120 and network 180 during operation of supply chain network 100. In one embodiment, one or more imaging devices are coupled with network 180 using a communications link, which may be any wireline, wireless, or other link suitable to support data communications between one or more imaging devices and network 180 during operation of supply chain network 100. Inventory system 140 may be coupled with network 180 using a communications link, which may be any wireline, wireless, or other link suitable to support data communications between inventory system 140 and network 180 during operation of supply chain network 100. Transportation network 150 may be coupled with network 180 using a communications link, which may be any wireline, wireless, or other link suitable to support data communications between transportation network 150 and network 180 during operation of supply chain network 100. One or more supply chain entities may be coupled with network 180 using a communications link, which may be any wireline, wireless, or other link suitable to support data communications between one or more supply chain entities and network 180 during operation of supply chain network 100. One or more computers 170 may be coupled with network 180 using a communications link, which may be any wireline, wireless, or other link suitable to support data communications between one or more computers 170 and network 180 during operation of supply chain network 100.

Although communication links 190a-190g are shown as generally coupling retail planning system 110, attribute recognition system 120, one or more imaging devices 130, inventory system 140, transportation network 150, one or more supply chain entities 160, and the computer to network 180, each of retail planning system 110, attribute recognition system 120, one or more imaging devices 130, inventory system 140, transportation network 150, one or more supply chain entities 160, and one or more computers 170 may communicate directly with each other, according to particular needs.

In another embodiment, network 180 includes the Internet and any appropriate local area networks (LANs), metropolitan area networks (MANs), or wide area networks (WANs) coupling retail planning system 110, attribute recognition system 120, one or more imaging devices 130, inventory system 140, transportation network 150, one or more supply chain entities 160, and one or more computers 170. For example, data may be maintained by locally or externally of retail planning system 110, attribute recognition system 120, one or more imaging devices 130, inventory system 140, transportation network 150, one or more supply chain entities 160, and one or more computers 170 and made available to one or more associated users of retail planning system 110, attribute recognition system 120, one or more imaging devices 130, inventory system 140, transportation network 150, one or more supply chain entities 160, and one or more computers 170 using a network or in any other appropriate manner. Those skilled in the art will recognize that the complete structure and operation of a network and other components within supply chain network 100 are not depicted or described. Embodiments may be employed in conjunction with known communications networks and other components.

The methods described herein may include one or more computers 170 receiving product data from automated machinery having at least one sensor and product data 314 corresponding to an item detected by the sensor. The received product data may include an image of the item, an identifier, as described above, product attributes, and/or other product data associated with the item. The method may further include automatic product and attribute recognition in response to transmitting product data 314 to attribute recognition system 120 or one or more computers 170 looking up the received product data in a database system associated with retail planning system 110, attribute recognition system 120, one or more imaging devices 130, inventory system 140, and/or transportation network 150 to identify the item or its corresponding attributes.

Figure 3:
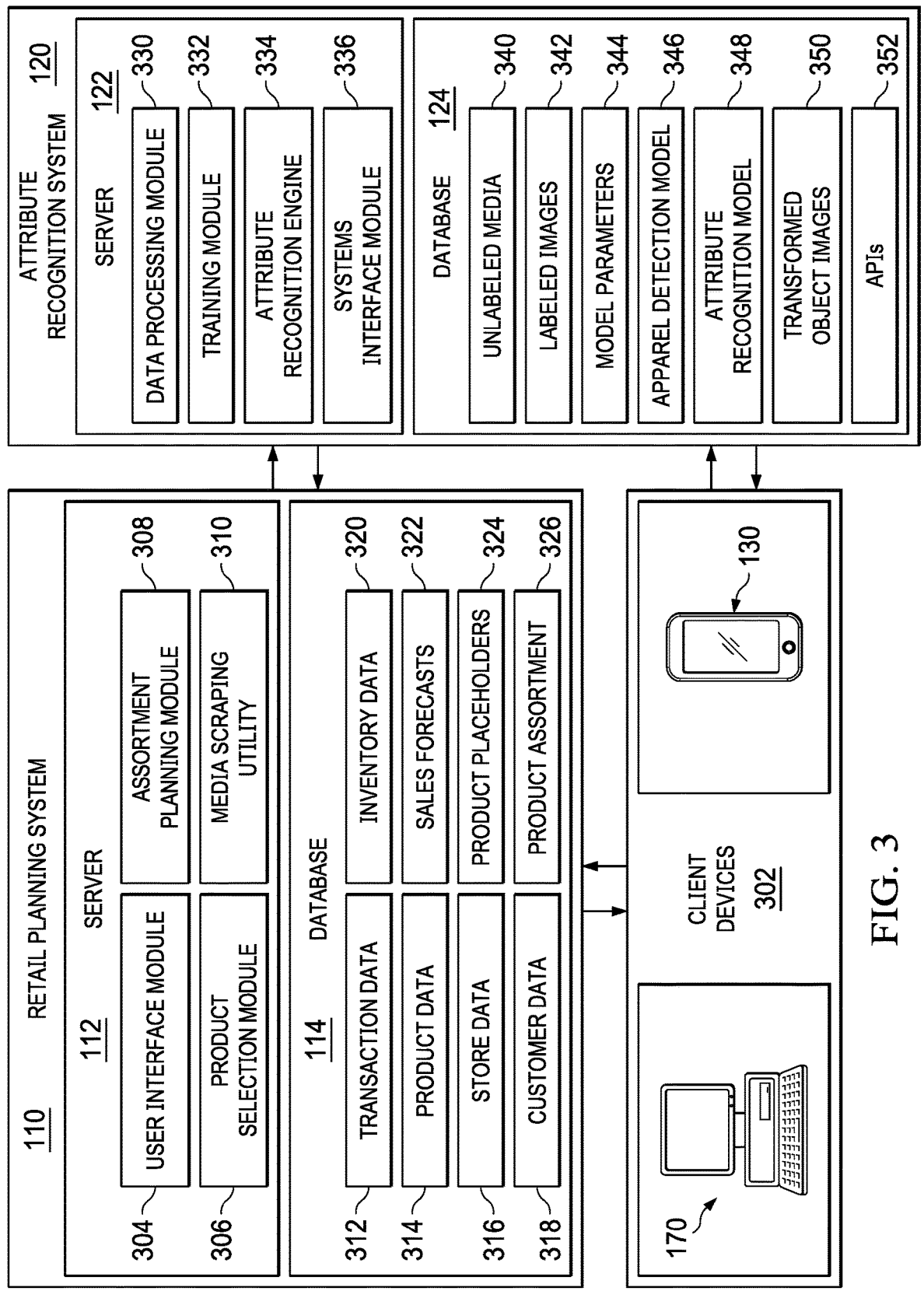
FIG. 3 illustrates the retail planning system, attribute recognition system, one or more imaging devices, and one or more computers of FIG. 1 in greater detail, in accordance with the first embodiment.

FIG. 3 illustrates retail planning system 110, attribute recognition system 120, one or more imaging devices 130, and one or more computers 170 of FIG. 1 in greater detail, in accordance with the first embodiment. As disclosed above, retail planning system 110 and attribute recognition system 120 may comprise one or more computers 170 having associated input devices, output devices, non-transitory computer-readable storage media, processors, memory, or other components for receiving, processing, storing, and communicating data using communication links 190h-190m, according to the operation of supply chain network 100.

According to embodiments, retail planning system 110 comprises client devices 302. Client devices 302 comprise one or more imaging devices 130 and one or more computers 170 that provide a portal to one or more applications and services hosted by retail planning system 110 and attribute recognition system 120. Client devices 302 communicate with retail planning system 110 and attribute recognition system 120 using one or more communication links 190h-190m. Although client devices 302 are described as communicating directly with retail planning system 110 and attribute recognition system 120 using the one or more communication links 190h-190m, embodiments contemplate communication among client devices 302, retail planning system 110, and attribute recognition system 120 using any direct or indirect communication links of any suitable communication network.

As disclosed above, one or more imaging devices 130 may provide a user interface for buyer application 208 which automatically extracts the visual attributes of a product image. According to embodiments, client devices 302, comprising one or more imaging devices 130 and computers 170, communicate product images to attribute recognition engine 334 of attribute recognition system 120 which identifies the product attributes and sends a responding communication comprising the identity of the recognized attributes, as described in further detail below. The client devices display the identified product attributes and provide a user interface for approval, correction, entry, or modification of the displayed product attributes.

By way of a further example, client devices 302 may comprise an in-store video display that shows advertisements, product information, and the like. One embodiment of the in-store video displays trending social media images and videos along with recommendations of in-store products (as well as the price, stock level, aisle, or other like information) that are similar to products shown in the trending images and videos. The recommendations of in-store products may be based, at least in part, on the product attributes identified by attribute recognition system 120 from the trending social media images and videos.

Additionally, retail planning system 110 comprises server 112 and database 114. Although retail planning system 110 is shown as comprising a single server 112 and a single database 114, embodiments contemplate any suitable number of servers or databases internal to or externally coupled with retail planning system 110. According to some embodiments, retail planning system 110 may be located internal to one or more retailers of one or more supply chain entities 160. In other embodiments, retail planning system 110 may be located external to one or more retailers of one or more supply chain entities 160 and may be located in, for example, a corporate retailer of the one or more retailers, according to particular needs.

As disclosed above, retail planning system 110 comprises server 112 and database 114. According to one embodiment, server 112 comprises user interface module 304, product selection module 306, assortment planning module 308, and media scraping module 310. Although server 112 is shown and described as comprising a single user interface module, a single product selection module, a single assortment planning module, and a single media scraping utility, embodiments contemplate any suitable number or combination of these located at one or more locations local to, or remote from, retail planning system 110, such as one or more servers or one or more computers at one or more other locations in supply chain network 100.

Database 114 of retail planning system 110 may comprise one or more databases or other data storage arrangements at one or more locations, local to, or remote from, server 112. Database 114 comprises, for example, transaction data 312, product data 314, store data 316, customer data 318, inventory data 320, sales forecasts 322, product placeholders 324, and product assortment 326. Although, database 114 is shown and described as comprising transaction data 312, product data 314, store data 316, customer data 318, inventory data 320, sales forecasts 322, product placeholders 324, and product assortment 326, embodiments contemplate any suitable number or combination of these, located at one or more locations, local to, or remote from, retail planning system 110, according to particular needs.

User interface module 304 generate a user interface for selecting, visualizing, modifying, saving, and/or deleting one or more of: transaction data, product data, store data, customer data, inventory data, like items, sales forecasts, product attributes, and the like. In addition, the user interface provides interactive graphical elements comprising selectable elements that, in response to a user selection, initiate a predetermined action, such as, for example, identifying the product and product attributes from digital visual media, modifying a product assortment 326, selecting similar or like-items, managing product placeholders, and other like actions, as described herein. The user interface may display one or more visual elements on an associated display device including for example, data, graphs, scores, product images, attributes and attribute values, selectable time periods, placeholders, and the like. In addition, the user interface displays data and interactive visual elements for selecting and configuring the products of a planned assortment of assortment planning module 308.

Product selection module 306 provides for configuring images, product attributes, and associated product data of current or previously-sold products, product placeholders, or candidate products for a planned product assortment 326. The user interface displays data and interactive visual elements for selecting and configuring product data organized and sortable by any measure, value, or dimension, including, for example, product attributes, attribute values, product identifiers, sales quantity, demand forecast, or any stored value, measure, or dimension model and calculate the sales of an product at any level of aggregation or disaggregation, product categories and clusters, sales forecasts, and the like.

When planning an assortment for an upcoming planning period, assortment planning module 308 selects the product to include in the assortment based, at least in part, on forecasted consumer demand for one or more product or product attributes. For example, retail planning system 110 may identify one or more products which are forecasted to sell well during an upcoming planning period based on attribute recognition of products from images or videos of trending products, sales of the same product or of similar products, across various retail stores based on sales volume, season, store type, and the like. To add new products to an upcoming assortment, assortment planning module 308 identifies new products and maps the new products to placeholders with similar product attributes.

Media scraping module 310 of server 112 of retail planning system 110 monitors and extracts product images from external data sources. In addition, media scraping module 310 may generate images for training data by scraping images from one or more ecommerce websites along with identifiers and product attributes, which are then tagged in the scraped images. In one embodiment, for example, media scraping module 310 identifies trending products and attributes from social media websites and applications (e.g. INSTAGRAM, YOUTUBE, etc.) by extracting images for attribute recognition from postings, advertisements, product reviews, fashion guides, photographs, and the like. Additional monitored data sources may comprise, for example, images from fashion e-magazines along with its attributes or specifications. By way of a further example and not by way of limitation, retail stores may comprise in-store display devices showing trending videos and images, as disclosed above. Media scraping module 310 captures images from the in-stored display to identify the attributes of products in the trending videos and images. As described in further detail below, when attribute recognition system 120 identifies products and attributes in trending videos and images, similar products sold by the retailer may be promoted by sales, advertisements, or the like.

The various types of data stored in database 114 of retail planning system 110 will now be discussed.

Transaction data 312 of database 114 may comprise recorded sales and returns transactions and related data, including, for example, a transaction identification, time and date stamp, channel identification, such as stores or online touch-points, product identification, actual cost, selling price, sales quantity, customer identification, promotions, and or the like. In addition, transaction data 312 may be represented by sales data having any suitable combination of values and dimensions, aggregated or un-aggregated, such as, for example, sales per week, sales per week per location, sales per day, sales per day per season, or the like.

Product data 314 of database 114 may comprise one or more data structures comprising products identified by, for example, a product identifier (such as a Stock Keeping Unit (SKU), Universal Product Code (UPC), or the like, as disclosed above) and one or more attributes and attribute types associated with the product ID, which may be stored as attribute data. Product data 314 may comprise any attributes of one or more products organized according to any suitable database structure, and sorted by, for example, category, attribute type, attribute value, product identification, or any suitable categorization or dimension. Product attributes also determine, at least in part, customer preferences, individually, and as customer segments, defined by similar customer shopping behavior, preferences for purchasing items with particular attribute values, or a combination of both.

Store data 316 of database 114 may comprise data describing the stores of the one or more retailers and related store information. Store data 316 may comprise, for example, a store ID, store description, store location details, store location climate, store type, store opening date, lifestyle, store area (expressed in, for example, square feet, square meters, or other suitable measurement), latitude, longitude, and other like store data. Store data 316 may include the identity and location of one or more stores grouped by store profiles into one or more store clusters used to allocate products targeted to the customer preferences associated with each cluster.

Customer data 318 may comprise customer identity information, including, for example, customer relationship management data, loyalty programs, and mappings between product purchases and one or more customers so that the customer associated with a transaction may be analyzed. Customer data 318 may include one or more customer preferences segments grouped according to customer profiles, characteristics, goals, motivations, or preferences, which may be used to analyze, sort, and evaluate supply chain data to determine solutions and plans for assortment planning, advertising, and other retail planning activities.

Inventory data 320 of database 114 may comprise any data relating to current or projected inventory quantities or states, order rules, or the like. For example, inventory data 320 may comprise the current level of inventory for each item at one or more stocking locations at one or more retailers, one or more distribution centers, or any other supply chain entity across supply chain network 100. In addition, inventory data 320 may comprise order rules that describe one or more rules or limits on setting an inventory policy, including, but not limited to, a minimum order quantity, a maximum order quantity, a discount, and a step-size order quantity, and batch quantity rules. According to some embodiments, retail planning system 110 accesses and stores inventory data 320 in database 114 of retail planning system 110 and/or database 144 of inventory system 140, which may be used by retail planning system 110 to place orders, set inventory levels at one or more stocking points, initiate manufacturing of one or more components, or the like. In addition, or as an alternative, inventory data 320 may be updated by receiving current item quantities, mappings, or locations from inventory system 140 and/or transportation network 150.

According to one embodiment, inventory data 320 includes inventory policies. Inventory policies may, for example, describe the reorder point and target quantity, or other inventory policy parameters that set rules for retail planning system 110, inventory system 140, and transportation network 150 to manage and reorder inventory. These inventory policies may be based on target service level, demand, cost, fill rate, or the like. Retail planning system 110 may determine inventory policies that comprise target service levels that ensure that a service level of one or more stores of the one or more retailers is met with a certain probability. For example, one or more retailers may set a service level at 95%, meaning the one or more retailers and/or the one or more distribution centers will set the desired inventory stock level at a level that meets demand of the one or more stores 95% of the time. Although, a particular service level target and percentage is described, embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level.

Retail planning system 110 generates a sales forecast for one or more products having one or more identified product attributes and which may be based, at least in part, on historic sales patterns, prices, promotions, weather conditions and other factors influencing demand of one or more items sold in one or more stores over a time period, such as, for example, one or more days, weeks, months, years, including, for example, a day of the week, a day of the month, a day of the year, week of the month, week of the year, month of the year, special events, paydays, and the like. In addition, retail planning system 110 generates a sales forecast for a new item (i.e. an item which has not previously been sold) based, at least in part, on historical sales data for one or more similar products having similar product attributes.

After calculating sales forecasts 322 or identifying product trends, retail planning system 110 generates product placeholders, according to some embodiments. Product placeholders 324 comprise a set of assigned attributes for a hypothetical or candidate product that is evaluated for inclusion within a product assortment 326 or comparison with any other existing or hypothetical product. According to embodiments, client devices 302, retail planning system 110, and attribute recognition system 120 synchronize and share product placeholders that are, for example, created from images captured by client devices 302, prepopulated with attributes recognized by attribute recognition system 120, and utilized for retail planning activities by retail planning system 110. By way of example only and not by way of limitation, client devices 302 generate assortment placeholders from captured images, provide for input and modification of product attributes, searching product categories and hierarchies, and extracting metadata and product attributes from the captured images. A product category indicates a level in a product hierarchy under which all products are described by the same attributes and/or the products are perceived by customers as being substitutable. For example, product category levels in the clothing retail industry may include women's dresses, men's pants, women's shoes, men's shoes, and the like, according to particular needs. However, product category levels may be more specific such as, for example, women's athletic shoes, women's casual shoes, and other like categories. Embodiments contemplate product category levels for retail products that are more specific or less specific categories of products, according to particular needs. Although attribute recognition and retail planning is described in connection with a fashion retailer with clothing having particular attributes and attribute values, embodiments contemplate any suitable retail industry and products having any suitable attributes, according to particular needs.

Product placeholders 324 are used by retail planning system 110 to generate product assortment 326. A product assortment 326 is set of retail products planned to be sold during an upcoming planning period that will match the product attributes predicted to be favored by customers during the planning period for one or more retail stores, sales channels, geographic regions, or other like group, cluster, or segment.

As disclosed above, attribute recognition system 120 comprises server 122 and database 124. Although attribute recognition system 120 is shown as comprising a single server 122 and a single database 124, embodiments contemplate any suitable number of servers or databases internal to or externally coupled with attribute recognition system 120. Server 122 of attribute recognition system 120 comprises data processing module 330, training module 332, attribute recognition engine 334, and systems interface module 336. Although server 122 is shown and described as comprising a single data processing module 330, a single training module 332, a single attribute recognition engine 334, and a single systems interface module 336, embodiments contemplate any suitable number or combination of data processing modules, training modules, attribute recognition engines, and systems interface modules located at one or more locations, local to, or remote from attribute recognition system 120, such as on multiple servers or one or more computers at one or more locations in supply chain network 100.

Database 124 of attribute recognition system 120 may comprise one or more databases or other data storage arrangement at one or more locations, local to, or remote from, server 122. Database 124 of attribute recognition system 120 comprises unlabeled media 340, labeled images 342, model parameters 344, apparel detection model 346, attribute recognition model 348, transformed object images 350, and APIs 352. Although database 124 of attribute recognition system 120 is shown and described as comprising unlabeled media 340, labeled images 342, model parameters 344, apparel detection model 346, attribute recognition model 348, transformed object images 350, and APIs 352, embodiments contemplate any suitable number or combination of data, located at one or more locations, local to, or remote from, attribute recognition system 120, according to particular needs.

Data processing module 330 receives one or more images along with bounding box location, apparel type, and attributes for one or more products. In addition, data processing module 330 may check received data for errors in the range, sign, and/or value and use statistical analysis to check the quality or the correctness of the data. In one embodiment, data processing module 330 of attribute recognition system 120 transforms the image output of apparel detection model 346. Training module 332 receives product images with annotations for training apparel detection model 346 and attribute recognition model 348. The product images are tagged or associated with metadata like category, bounding box, attributes, and the like. Because CNNs will accurately recognize only those categories which are available in a training phase, attribute recognition system 120 comprises an ingestion pipeline to receive additional data which may then be used to retrain the models.

Attribute recognition engine 334 receives image data without the bounding box or labeled attributes and presents the image data to apparel detection model 346. After transforming by data processing module 330, the output image is presented to attribute recognition model 348. Systems interface module 336 comprises an interface between client devices 302, retail planning system 110, and attribute recognition system 120. As described in further detail below, retail planning system 110 and one or more imaging devices 130 communicate with attribute recognition system 120 using one or more Application Programming Interfaces (APIs). According to one embodiment, the REST API exposes an attribute recognition service of attribute recognition system that receives an input image and provides the attributes and attribute values as output to one or more other retail planning systems, such as, for example, assortment planning, store fulfillment, clearance and lifecycle pricing.

The various types of data stored in database 124 of attribute recognition system 120 will now be discussed in connection with the following FIGURES.

Figure 4:
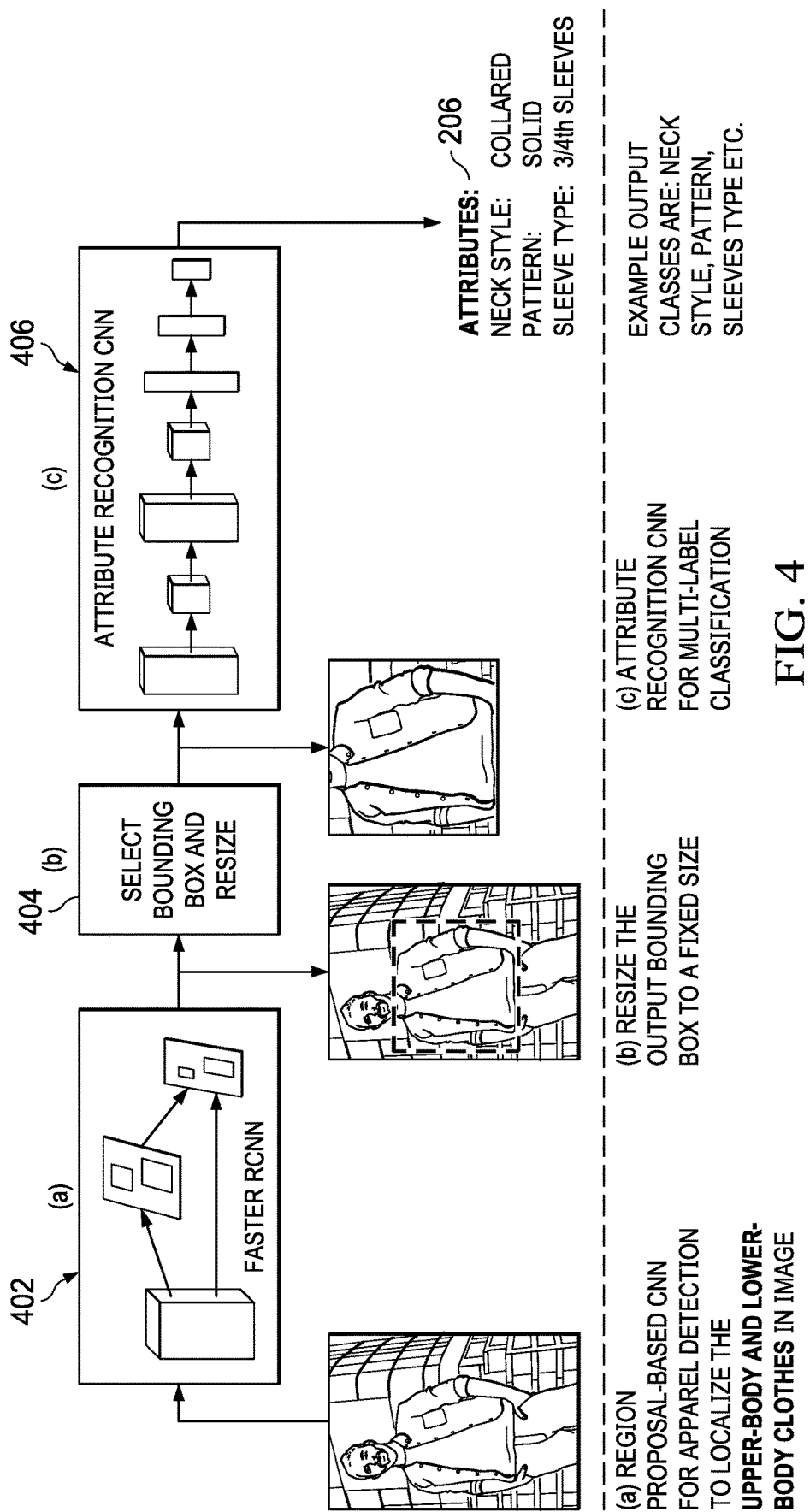
FIG. 4 illustrates the attribute recognition system, in accordance with an embodiment.

FIG. 4 illustrates attribute recognition system 120, in accordance with an embodiment. Attribute recognition system 120 comprises a Region proposal-based Convolutional Neural Network (R-CNN) 402 for apparel detection, data processing module 330 that resizes images in bounding boxes to a fixed size 404, and an attribute recognition CNN for multi-label classification 406 that generates attributes 206, as disclosed above.

Apparel detection model 346 is a Region Proposal-Based Convolutional Neural Networks (Faster R-CNN) trained for object recognition using bounding box-labeled images. As described in further detail below, apparel detection model 346 is trained to recognize products from images using training images 700a-700f (FIG. 7) with bounding boxes 1200a-1200c (FIG. 12) identifying the location of the product within the images. According to embodiments, the Faster R-CNN of apparel detection model 346 is trained to recognize apparel from one or more images of apparel, either being worn or not. Using the illustrated example of FIG. 4 of a woman wearing a red shirt and black skirt, a bounding box is located over the red shirt and labeled as "shirt" "top" "upper body clothing" or any other suitable label, and a bounding box is located over the black skirt and labeled as "skirt" "bottom" "lower body clothing" or any other suitable label. After training, apparel detection model 346 is presented with images and, in response, identifies the location and identity of the product in the image.

According to embodiments, apparel detection model 346 comprises the Faster R-CNN, a deep learning-based object detection network. The Faster R-CNN comprises the following three internal networks:
  (i) Feature extraction network: the first layer in the model which is directly applied on the image to extract important features and convert the image into multiple feature maps, each of which is a lower resolution image of the original image.
  (ii) Region proposal network (RPN): The RPN generates one or more bounding boxes, Region Of Interests (ROIs), having a higher probability of containing the product.
  (iii) Detection Network: This network receives input from both the Feature extraction network and the RPN and generates a bounding box (spatial co-ordinates) containing the product and a probability score (confidence) of the bounding box to contain the product.

In one embodiment, apparel detection model 346 identifies many candidate proposals from an input image and generates an output of a bounding box location for the identified product, the recognized product identification for the candidate proposals which have properties recognized as an identified object.

According to embodiments, the feature extraction network is the VGG-16 pretrained network, trained on an IMAGENET dataset and comprising approximately 138 million parameters. The VGG-16 feature extraction network comprises thirteen convolution layers of 3×3 kernel, wherein every two convolutional layers are followed by one max-pooling layer with a pool-size of 2×2. In one embodiment, the three final fully-connected layers are not used for feature extraction. In addition, the RPN comprises three convolutional layers, and the final detection network has four fully-connected layers in which two are common and shared by the regression and classification layers.

The weights of these layers are learned during the training phase which is run for a particular quantity of epochs. After each epoch, validation accuracy is compared against the earlier one and the best model is stored to a non-transitory computer-readable medium, such as, for example, database 114 of retail planning system 110, database 124 of attribute recognition system 120, or one or more locations local to, or remote from, supply chain network 100. The stopping criterion may comprise a quantity of epochs or a desired accuracy threshold.

One forward and backward pass of the entire training data is considered as one epoch in neural network training. During the training phase, in each epoch, the entire training dataset in passed through all the layers of network 180 and the final result at the last layer is compared against the actual labels of the image to compute the error rate (i.e. also known as loss). During a back propagation activity, training module 332 fine tunes the weights of all layers to reduce the error rate. According to embodiments, the back propagation activity increases the reliability of the model after each epoch. The sigmoid activation function may be used in the final layer and a binary cross-entropy loss function to compute the loss or error rate to fine tune the weights in the back propagation.

The input for apparel detection model 346 is the fashion images and the output is the bounding box (spatial location of the apparel) in the image. In each epoch, training module 332 compares the bounding box coordinates with the actual to predict the error rates.

The VGG-16 pretrained model of the feature extraction network accelerates the training process and improves its performance, by transfer learning. Deep learning reuses the weights of the VGG-16 trained on a similar problem and fine-tunes the weights during training to adopt to the learning of the current problem.

Data processing module 330 transforms the input image based on the bounding box location identified by apparel detection model 346. In one embodiment, data processing module 330 crops the parts of the image outside of the bounding box. In addition, or as an alternative, data processing module 330 rescales the cropped image to a predetermined resolution, resizes the cropped image to a predetermined set of dimensions, and presents the transformed image to attribute recognition model 348.

Attribute recognition model 348 comprises a CNN inspector having one or more convolutional layers, one or more max pool layers, and one or more fully connected layers. The attribute recognition CNN is trained to recognize attribute values for attribute types of interest to a retail planning system. To further describe attribute recognition model 348, an example is now given of a clothing retailer that trains attribute recognition model 348 to recognize attributes of apparel comprising the attribute types: neck styles, pattern, and sleeve type. Continuing with this example, attribute recognition model 348 is trained to recognize the attribute values for each attribute type, such as V-neck, off-shoulder, and round (for neck style), three-quarters, short, and full (for sleeve length), striped, solid, or printed (for pattern). Each of the attribute values recognized by attribute recognition system 120 in the images is represented by at least one image in the training data. Although attribute recognition model 348 is described as being trained to recognize attributes of apparel, embodiments contemplate attribute recognition model 348 to recognize other suitable attributes of other suitable product types, according to particular needs.

Attribute recognition model 348 is a multi-label classification problem. In the above-mentioned example, there are ten classes for the image classification model to recognize such as, for example, V-neck, off-shoulder, round neck, short sleeve, long sleeve, solid pattern, printed, striped, and the like. The attribute-recognition model may classify each image in one or more classes. For example, a retail product comprising a shirt may comprise a V-neck with short sleeves and a solid pattern. Similar to apparel detection model 346, pretrained models, such as, for example, the VGG-16, ZF, RESNET, and GOOGLENET, and the like, solve the multi-label classification to accelerate the training process and quickly converge network 180. In one embodiment, the pretrained model comprises a fixed size feature extractor. In addition, the final fully-connected layer is modified so that the number of neurons in the final layer is equals to the number of classes (attributes) used in the attribute recognition problem.

According to an embodiment, the input to network 180 is a fixed resolution apparel image. Apparel detection model 346 processes the apparel image through the Faster R-CNN network and the resultant output is a vector where each value represents the probability of the corresponding attribute present in the image. During the training phase, training module 332 compares the output with the actual labels (which is a binary vector where 1 corresponds to the attribute presence and 0 implies the absence of the attribute) and calculates the loss.

Figure 5:
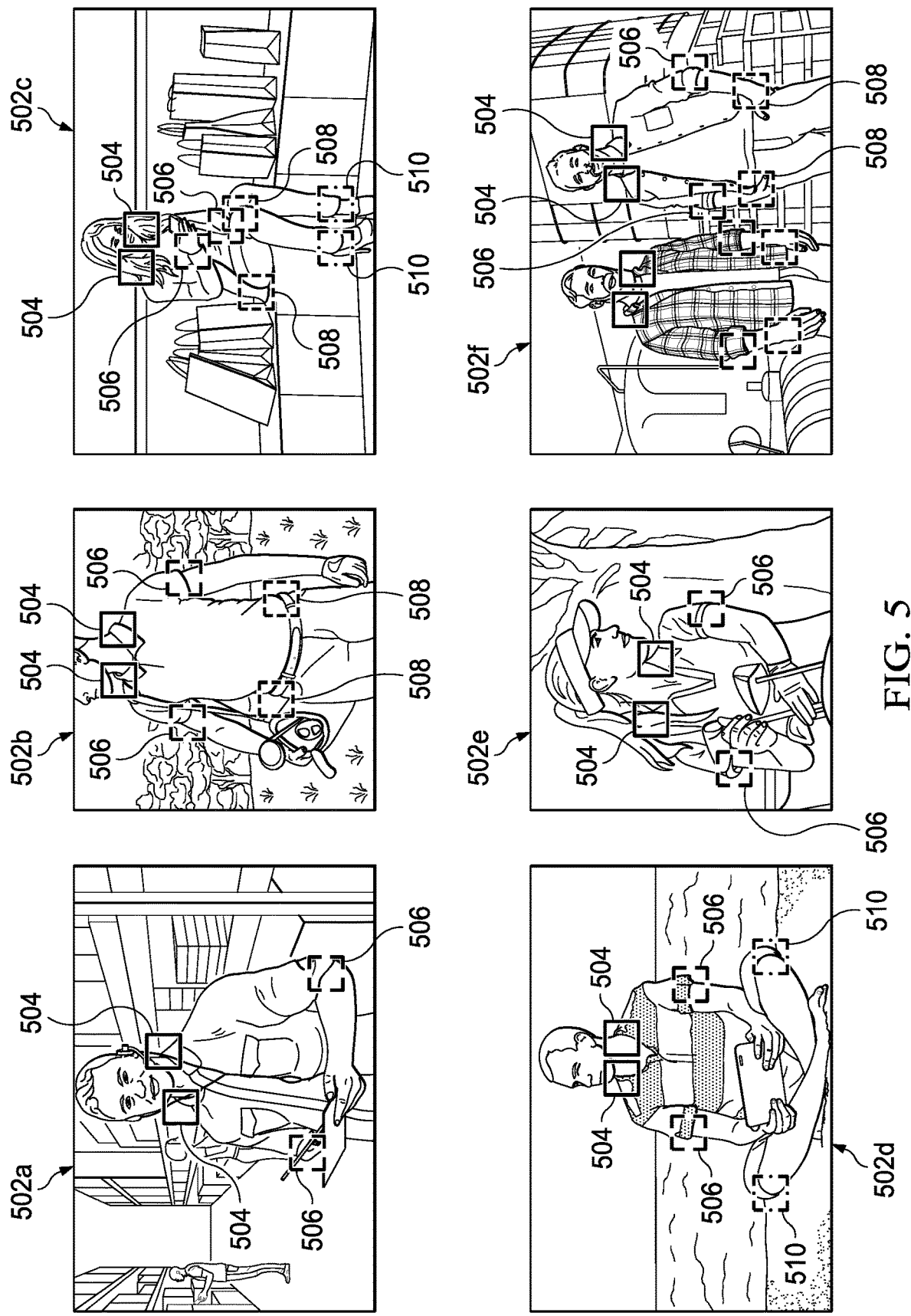
FIG. 5 illustrates landmark labeling of image attributes, in accordance with an embodiment.

FIG. 5 illustrates landmark labeling of image attributes, in accordance with an embodiment. Landmark labeling comprises marking landmark locations in an image and training a model to learn visual features based on the landmark locations using a local pooling technique. By way of further explanation only and not by way of limitation, a set of unlabeled images 502a-502f illustrate clothing having one or more attributes. According to one embodiment, each of the unlabeled images 502a-502f are labeled with landmark locations particular to the area of the model being marked. Continuing with the illustrated example, landmark locations comprise collar landmarks 504, sleeve length landmarks 506, waist landmarks 508, and leg length landmarks 510.

Using the landmark labeling method for attribute extraction is heavily reliant on the landmark labelled image dataset, which is difficult and time-consuming to prepare. In addition, it does not address the background noise removal, which degrades the performance of attribute recognition engine 334.

Figure 6:
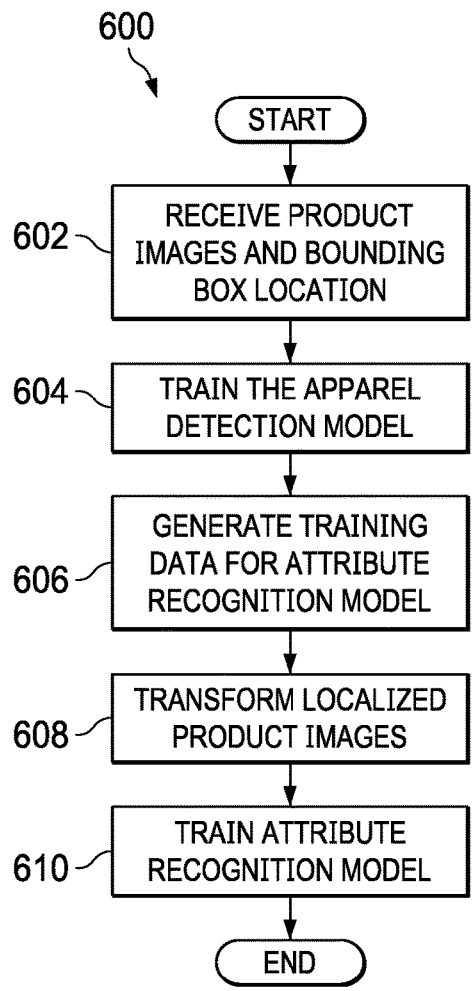
FIG. 6 illustrates the method of training the apparel detection model and attribute recognition model, in accordance with an embodiment.

FIG. 6 illustrates method 600 of training apparel detection model 346 and attribute recognition model 348, according to an embodiment. Method 600 comprises one or more activities, which although described in a particular order may be implemented in one or more combinations, according to particular needs.

At activity 602, training module 332 receives the training data comprising u an image with associated bounding box. As disclosed above, the image and bounding box comprises the spatial coordinates of the location of the object (here, a retail product) within the image. Each image of the training data comprises annotations of the spatial location of the required object in the image.

At activity 604, training module 332 trains apparel detection model 346 using the training data. For the clothing retailer example, training module 332 trains the R-CNN to recognize and localize: upper-body apparel and lower-body apparel from unlabeled input images. Although apparel detection model 346 is described as recognizing and localizing apparel according to upper-body apparel and lower-body apparel, embodiments contemplate training the detection model identifying groceries with specific packaging, full-body clothes, furniture and other home-décor items.

At activity 606, and as disclosed above, the trained apparel detection model generates training data for attribute recognition model 348. According to embodiments, when training attribute recognition system 120 to recognize product attributes, the training data comprises images without background noise. According to embodiments, the training attribute recognition model 348 with images without background clutter or noise is needed to focus this model to recognize the visual attributes present in the object without concentrating on the apparel localization. Accordingly, the training data of attribute recognition model 348 comprises only the localized object, which improves performance and to rely on apparel detection model 346 for the localization task.

Figure 7:
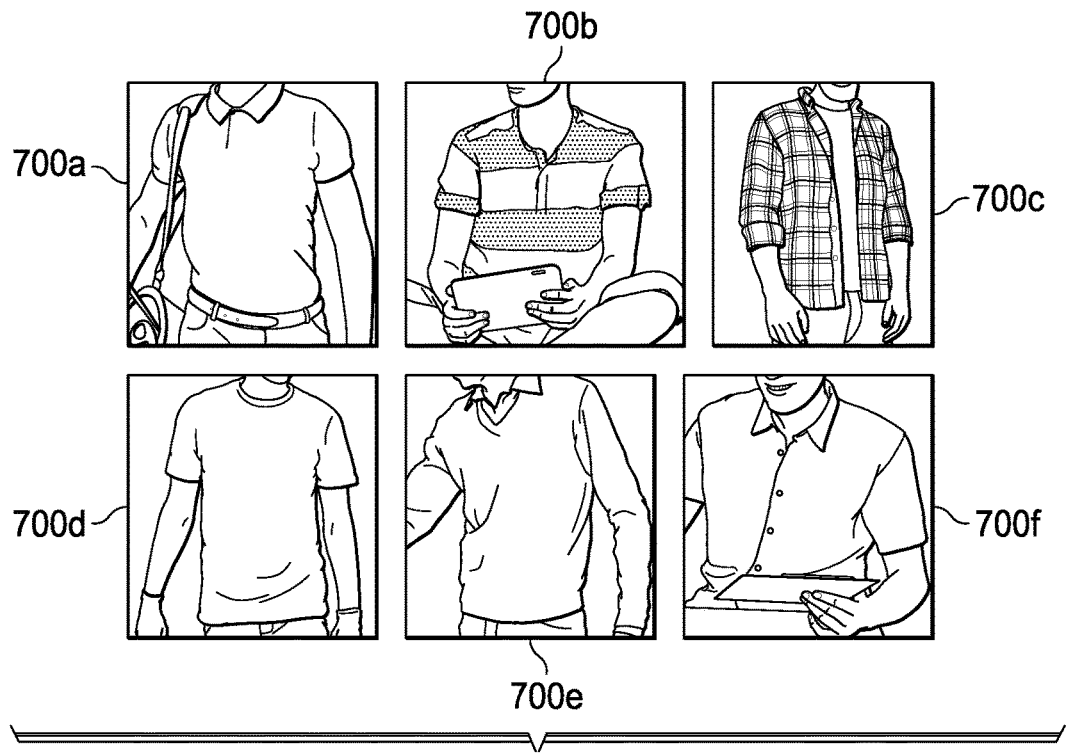
FIG. 7 illustrates training images for upper body apparel, in accordance with an embodiment.

FIG. 7 illustrates training images 700a-700f for upper body apparel, in accordance with an embodiment. When training attribute recognition model 348 to recognize product attributes, retail planning system 110 may use labeled images 342, wherein retail planning system 110 tags the images of a particular product with the identified product attributes. In one embodiment, labeled images 342 for attribute recognition model 348 are generated by data processing module 330 from a data source having product images associated with product attributes (such as, for example, images and attributes stored in a product inventory database, or attributes and images scraped from an e-commerce website, an online clothing retailer, or the like). For the clothing retailer example, the trained CNN identifies all of the upper-body apparel from the product images and generates the localized product images comprising the apparel identification and the bounding box location.

At activity 608, data processing module 330 transforms the localized product images. Training module 332 presents the product images to apparel detection model 346, which generates the localized product images. From these images, data processing module 330 generates the transformed (e.g. cropped, rescaled, resized, etc.) image of the product within the bounding box. The transformed images of the product, the product identification, and the attributes associated with the original product image are the training data for attribute recognition model 348.

At activity 610, data processing module 330 trains attribute recognition model 348. Continuing with the previous example of the clothing retailer, attribute recognition system 120 receives training data comprising images and videos of various types of apparel, such as, for example, images and videos of the apparel as worn by clothing models. In this example of attribute recognition model training, the training data comprises the image as well as the associated attributes present in the image. As stated above, training attribute recognition model 348 with the entire images does not yield good results. Instead, the images are first passed through apparel detection model 346, which localizes the desired object (e.g. apparel item) within the image and discards the rest (which is typically the unwanted background information). The localized image is transformed. Training module 332 trains attribute recognition model 348 with the transformed image and the attribute information.

Figure 8:
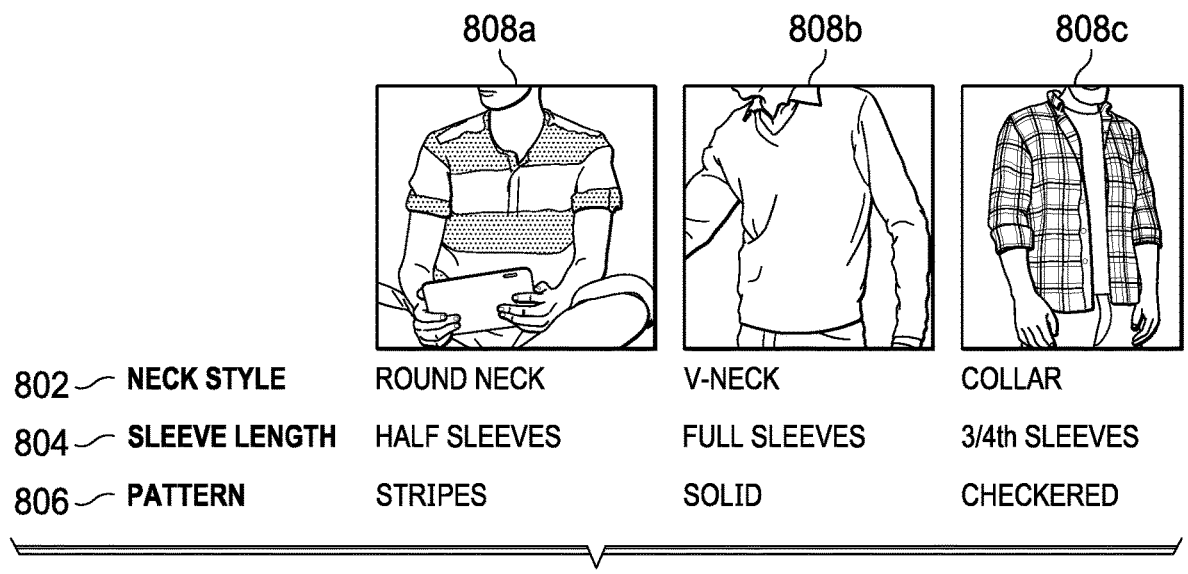
FIG. 8 illustrates results of the attribute recognition engine, in accordance with an embodiment.

FIG. 8 illustrates results of attribute recognition engine 334, in accordance with an embodiment. In this example, the clothing retailer detected neck style 802, sleeve length 804, and pattern 806 of three upper-body apparel images 808a-808c. In first image 808a, attribute recognition model 348 identifies neck style 802 is round neck, sleeve length 804 is half, and pattern 804 is stripes. For second image 808b, attribute recognition engine 334 detects neck style 802 as V-neck, sleeve length 804 is full-sleeve length, and pattern 806 is solid pattern. Third image 808c shows the results of upper-body apparel comprising a collar neck, ¾ sleeves, and a checkered pattern. Although particular attribute types and attribute values are shown for three images 808a-808c of upper-body apparel, embodiments contemplate images having any suitable type of product and attribute recognition engine 334 trained to identify any suitable attributes, according to particular needs. After attribute recognition system 120 identifies the product attributes in the one or more images, retail planning system 110 may then (based, at least in part, on the identified attributes) generate a product assortment 326, calculate a sales forecast, identify like-items, identify product trends, or other retail planning activities.

Figure 9:
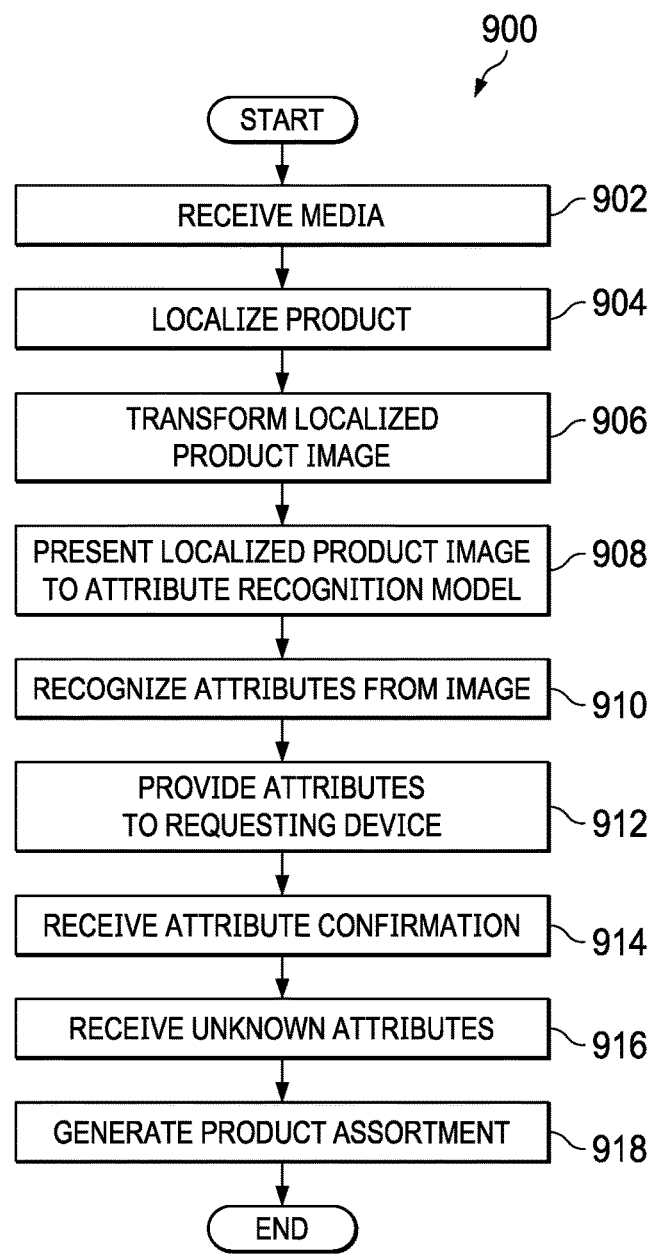
FIG. 9 illustrates the method of generating a product assortment, in accordance with an embodiment.

FIG. 9 illustrates method 900 of generating a product assortment 326, in accordance with an embodiment. Method 900 comprises one or more activities, which although described in a particular order may be implemented in one or more combinations, according to particular needs.

At activity 902, one or more imaging devices 130 receive unlabeled media 340 targeted for attribute recognition. As described above, one or more imaging devices 130 transmit one or more images, video, or other media 202 to attribute recognition engine 334 of attribute recognition system 120.

Figure 10:
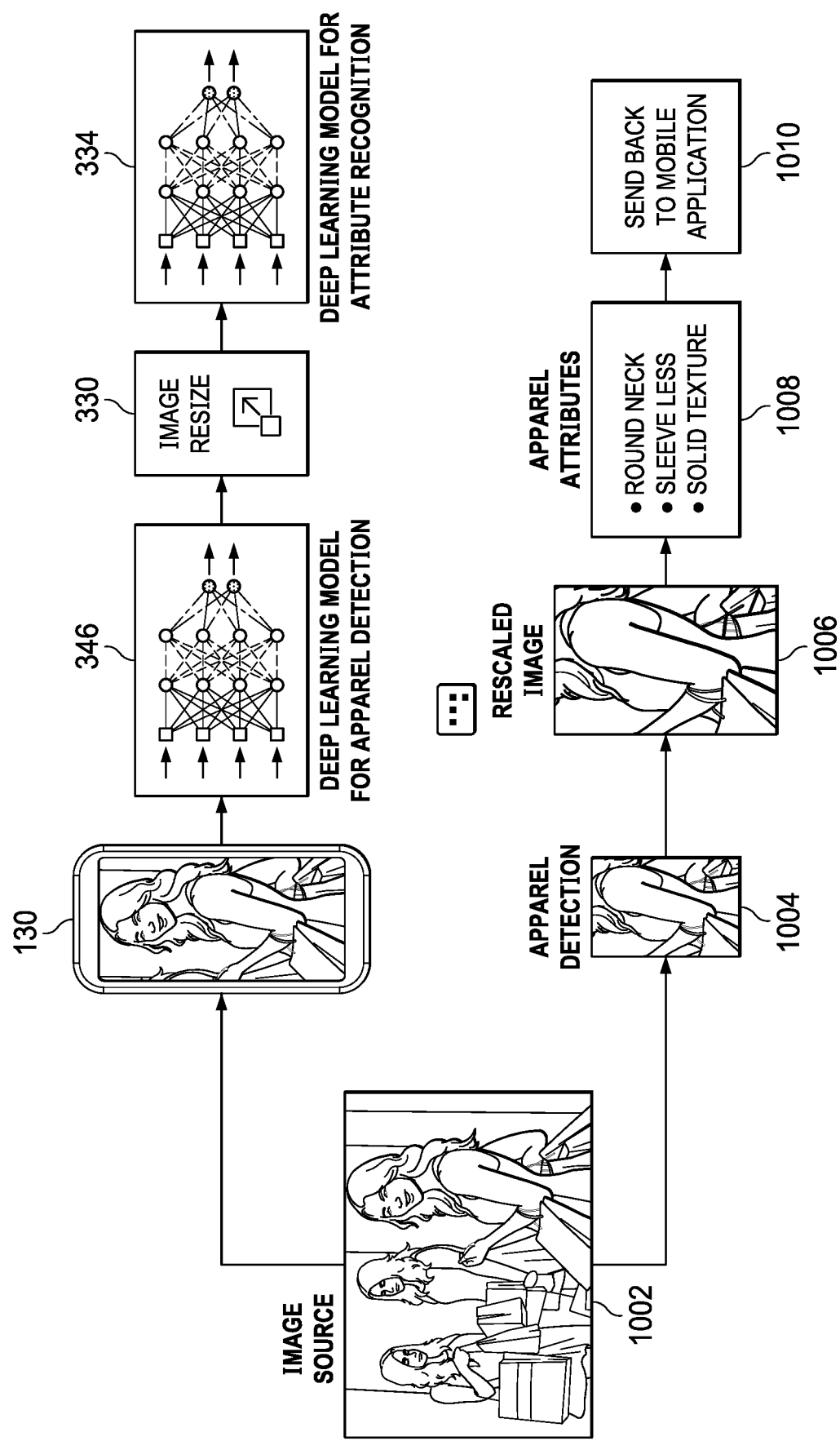
FIG. 10 illustrates attribute recognition of an image, in accordance with an embodiment.

FIG. 10 illustrates attribute recognition of an image, in accordance with an embodiment. As stated above, media 202 (e.g., digital visual media, such as, for example, images, videos, and the like) is received by attribute recognition system 120. In the illustrated example of FIG. 10, the input is an image 1002 captured by one or more imaging devices of a person shopping and featuring several individuals wearing various types of apparel. One or more imaging devices 130 transmit the image to attribute recognition system 120, and the apparel detection model 346 localizes the apparel within the received image at activity 1004. Data processing module 330 resizes the image at activity 1006, and, at activity 1008, attribute recognition engine 334 detects attributes of the rescaled image. At activity 1010, attribute recognition system 120 transmits the apparel attributes to one or more imaging devices 130, as described in further detail below.

Figure 11:
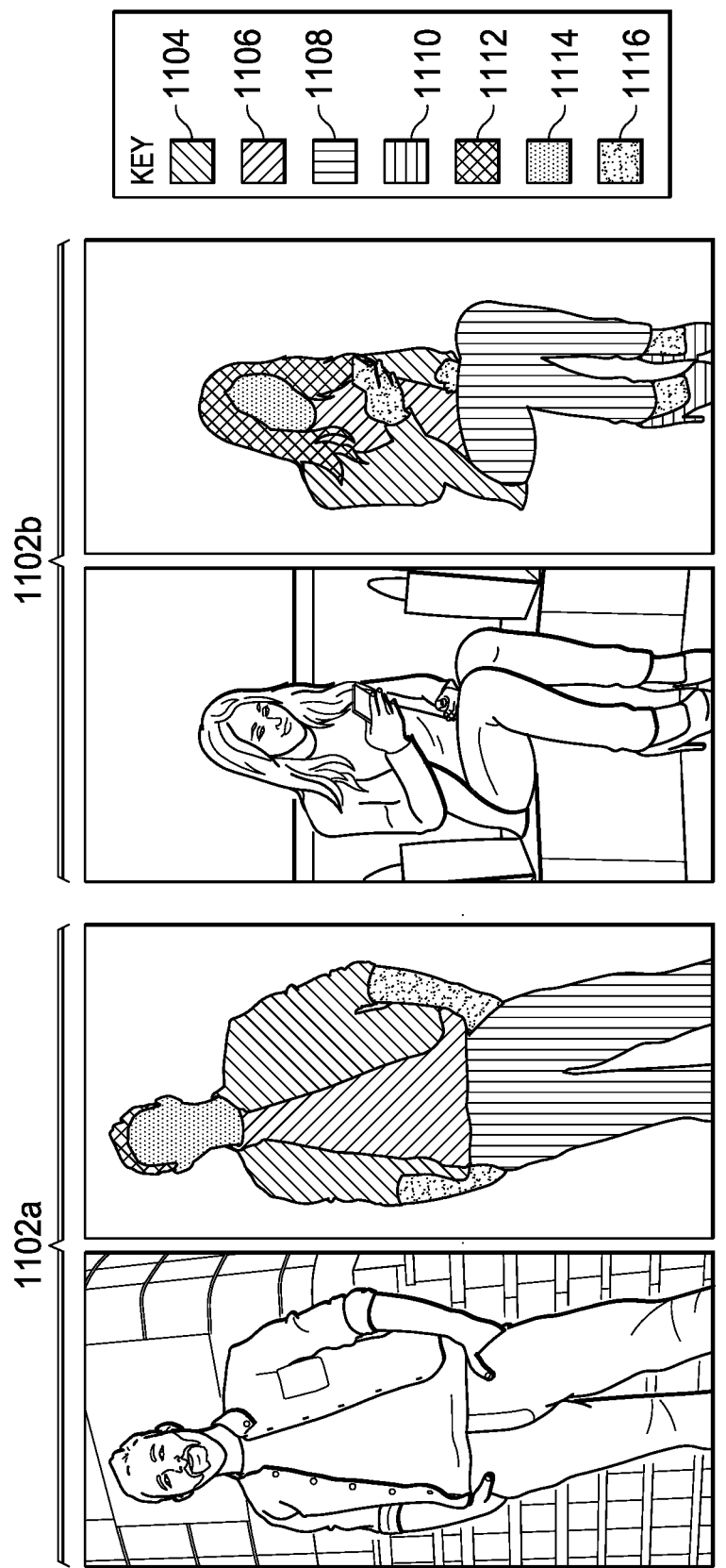
FIG. 11 illustrates apparel localization, in accordance with an embodiment.

FIG. 11 illustrates apparel localization, in accordance with an embodiment. By way of example only, and not by way of limitation, apparel detection model 346 is an object detection model trained to detect apparel, accessories, and people from an image. In this example, the attribute recognition engine 334 has identified the objects within the two sample images 1102a-1102b. In this example, various shadings represent different identified clothing types and persons of the image: a first shading 1104 indicates an outer-wear upper body apparel, a second shading 1106 is upper-body apparel (non-outerwear), a third shading 1108 is lower body apparel, a fourth shading 1110 is footwear, a fifth shading 1112 represents hair, a sixth shading 1114 is a face, and a seventh shading 1116 is arms, hands, legs, and feet. Although images 1102a-1102b are described with particular shadings representing particular clothing and persons, embodiments contemplate any suitable shadings selected to represent any attributes, objects, persons, or parts of a person, according to particular needs.

Figure 12:
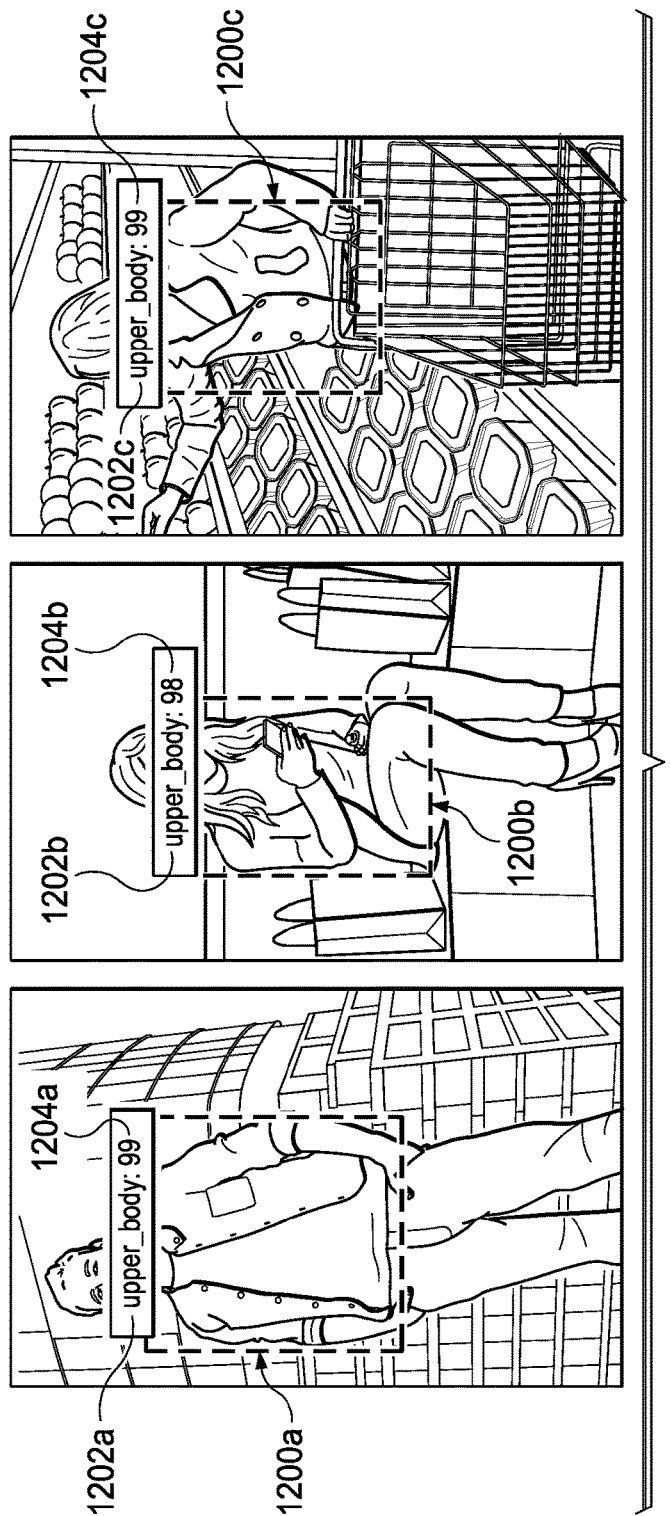
FIG. 12 illustrates results of the apparel detection model, in accordance with an embodiment.

FIG. 12 illustrates results of apparel detection model 346, in accordance with an embodiment. Apparel detection model 346 may detect apparel by placing bounding box 1200a-1200c over the identified object 1202a-1202c. In addition, bounding box 1200a-1200c may comprise labels 1204a-1204c (here, upper_body) that indicates the object identified in bounding box 1200a-1200c, as well as a confidence score 1206a-1206c (99%, 98%, and 99%, respectively) that corresponds to a probability that the detected object is correctly labeled. In this example is a set of three different models wearing various outfits and standing in different background scenes, with varying illumination, conditions, and resolutions. According to one embodiment, attribute recognition engine 334 searches for only a particular object selected by a user.

At activity 906, data processing module 330 of attribute recognition system 120 transforms the product image localized within bounding box 1200a-1200c, as disclosed above. Attribute recognition engine 334 presents the transformed object images 350 to attribute recognition model 348, at activity 908.

Figure 13:
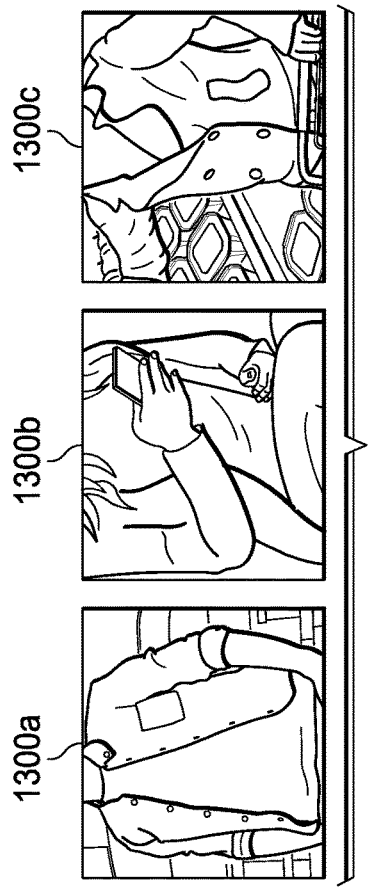
FIG. 13 illustrates the transformed images of products localized from the bounding boxes of FIG. 12, in accordance with an embodiment.

FIG. 13 illustrates transformed images 1300a-1300c of products localized from the bounding boxes 1200a-1200c of FIG. 12, in accordance with an embodiment. Product images are received from various sources and may comprise different sizes and resolutions. The output images of attribute recognition model 348 are transformed to a fixed size, and the fixed-size image is presented to attribute recognition engine 334, which generates a list of recognized attributes in the product image, at activity 910. The attributes that are recognized in the product images are the attributes that are trained to attribute recognition model 348 during a training method 600, as disclosed above.

Attribute recognition system 120 provides the identification of the apparel and recognized attributes to client devices 302, at activity 912. Client devices 302 or retail planning system 110 send media 202 to attribute recognition system 120, which responds with the identification of the product and the recognized attributes from the received media 202. When client devices 302 receive the response from attribute recognition system 120, client devices 302 generates product placeholders 324 for the identified product and displays a table with attributes associated with the identified product and prepopulates fields for each of the attribute values recognized from media 202.

At activity 914, client devices 302 request confirmation that the recognized attributes are correct. According to some embodiments, the recognized attributes of the product are displayed on one or more imaging devices 130 along with interactive graphical elements that provides for user selection of an approval and/or a rejection of the identified attributes.

At activity 916, client devices 302 provide for input of unknown attributes. Although many attributes are recognized visually, client devices 302 may, in some embodiments, generate attribute fields for attribute values that are not detected by attribute recognition system 120, but which may however be input by a user or retrieved from a product database. In one embodiment, for example, buyer application 208 of one or more imaging devices 130 provides the option to input or select a value for fabric type, fashion type, style type, and the like. Based on the approval or rejection and the input or selection of unknown attributes, the image and the attributes may be used as training data to improve attribute recognition model 348.

At activity 918, retail planning system 110 generates a product assortment 326 based, at least in part, on the product attributes. As disclosed above, retail planning system 110 selects product assortment 326 based on the expected sales of the selected products. For the products in the images that are processed by attribute recognition system 120, which have not yet been introduced and therefore have no sales history, sales forecasts 322 are calculated based on the sales of products having similar attributes. The products having similar attributes to a candidate product may be referred to as like-items. According to embodiments, retail planning system 110 identifies like-items by selecting items from product data 314 which have historical sales data and whose attribute values match the product planned for the new assortment. The optimal like-item is a product having identical attribute values, which then become less alike according to the number of non-matching attributes between a product and its identified like-items.

In response to generating the new (or modified) product assortment 326, retail planning system 110 initiates one or more supply chain processes, as disclosed above, to alter the production, transportation, packaging, location, inventory, or the like, at one or more supply chain entities to ensure the products of the new assortment are in stock at one or more retail location during the planned sale period of the new assortment.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of automatic product attribute recognition, comprising:
    a computer, comprising a processor and memory, and configured to:
        receive training images comprising bounding boxes associated with one or more products in the training images;
        receive metadata comprising attribute values, category and bounding box for each of the one or more products in the training images;
        train a first convolutional neural network (CNN) model to generate bounding boxes for and identify each of the one or more products with the training images until the accuracy of the first CNN model is above a first predetermined threshold, wherein the training further comprises a back propagation activity comprising a sigmoid activation function and a binary cross-entropy loss function to fine tune weights in the first CNN model;
        crop the training images to the image area within the bounding boxes;
        resize the cropped images to a predetermined set of dimensions;
        train a second CNN model with the resized cropped images and one or more attributes for each of the products associated with the resized cropped images until the second CNN generates attribute values for the one or more attributes with an accuracy above a second predetermined threshold, wherein the training of the second CNN model further comprises a back propagation activity comprising a sigmoid activation function and a binary cross-entropy loss function to fine tune weights in the second CNN model, wherein the second CNN model is a multi-label classification problem; and
        automatically recognize the one or more attributes for a new product image by presenting the product image to the first and second CNN models.

2. The system of claim 1, wherein the computer is further configured to:
    transform the resized cropped images by one or more of rescaling and resizing before presenting the resized cropped images to the second CNN model.

3. The system of claim 1, wherein the computer is further configured to:
    receive an image captured from one or more imaging devices;
    provide the image to the first and second CNN models;
    provide the automatically recognized one or more attributes to the one or more imaging devices; and
    receive a confirmation that at least one of the one or more attributes was correctly recognized by the first and second CNN models.

4. The system of claim 1, wherein the computer is further configured to:
    receive a confirmation that at least one of the one or more attributes was correctly recognized by the first and second CNN models, the confirmation indicating the at least one of the one or more attributes is approved; and
    in response to receiving the confirmation, add the image and the at least one of the one or more approved attributes to the training images.

5. The system of claim 1, wherein the computer is further configured to:
    generate product placeholders comprising a set of assigned attributes for a candidate product.

6. The system of claim 1, wherein the computer is further configured to:
    synchronize a set of product placeholders created from images captured by one or more imaging devices; and
    prepopulate the set of product placeholders with attributes recognized by the first and second CNN models.

7. The system of claim 1, wherein the products are substitutable.

8. A method of automatic product attribute recognition, comprising:
    receiving training images comprising bounding boxes associated with one or more products in the training images;
    receiving metadata comprising attribute values, category and bounding box for each of the one or more products in the training images;

training a first convolutional neural network (CNN) model to generate bounding boxes for and identify each of the one or more products with the training images until the accuracy of the first CNN model is above a first predetermined threshold, wherein the training further comprises a back propagation activity comprising a sigmoid activation function and a binary cross-entropy loss function to fine tune weights in the first CNN model;

cropping the training images to the image area within the bounding boxes;

resizing the cropped images to a predetermined set of dimensions;

training a second CNN model with the resized cropped images and one or more attributes for each of the products associated with the resized cropped images until the second CNN generates attribute values for the one or more attributes with an accuracy above a second predetermined threshold, wherein the training of the second CNN model further comprises a back propagation activity comprising a sigmoid activation function and a binary cross-entropy loss function to fine tune weights in the second CNN model, wherein the second CNN model is a multi-label classification problem; and automatically recognizing the one or more attributes for a new product image by presenting the product image to the first and second CNN models.

9. The method of claim 8, further comprising:
transforming the resized cropped images by one or more of rescaling and resizing before presenting the resized cropped images to the second CNN model.

10. The method of claim 8, further comprising:
receiving an image captured from one or more imaging devices;
providing the image to the first and second CNN models;
providing the automatically recognized one or more attributes to the one or more imaging devices; and
receiving a confirmation that at least one of the one or more attributes was correctly recognized by the first and second CNN models.

11. The method of claim 8, further comprising:
receiving a confirmation that at least one of the one or more attributes was correctly recognized by the first and second CNN models, the confirmation indicating the at least one of the one or more attributes is approved; and
in response to receiving the confirmation, adding the image and the at least one of the one or more approved attributes to the training images.

12. The method of claim 8, further comprising:
generating product placeholders comprising a set of assigned attributes for a candidate product.

13. The method of claim 8, further comprising:
synchronizing a set of product placeholders created from images captured by one or more imaging devices; and
prepopulating the set of product placeholders with attributes recognized by the first and second CNN models.

14. The method of claim 8, wherein the products are substitutable.

15. A non-transitory computer-readable medium embodied with software, the software when executed:
receives training images comprising bounding boxes associated with one or more products in the training images;
receives metadata comprising attribute values, category and bounding box for each of the one or more products in the training images;
trains a first convolutional neural network (CNN) model to generate bounding boxes for and identify each of the one or more products with the training images until the accuracy of the first CNN model is above a first predetermined threshold, wherein the training further comprises a back propagation activity comprising a sigmoid activation function and a binary cross-entropy loss function to fine tune weights in the first CNN model;
crops the training images to the image area within the bounding boxes;
resizes the cropped images to a predetermined set of dimensions;
trains a second CNN model with the resized cropped images and one or more attributes for each of the products associated with the resized cropped images until the second CNN generates attribute values for the one or more attributes with an accuracy above a second predetermined threshold, wherein the training of the second CNN model further comprises a back propagation activity comprising a sigmoid activation function and a binary cross-entropy loss function to fine tune weights in the second CNN model, wherein the second CNN model is a multi-label classification problem; and
automatically recognizes the one or more attributes for a new product image by presenting the product image to the first and second CNN models.

16. The non-transitory computer-readable medium of claim 15, wherein the software when executed further:
transforms the resized cropped images by one or more of rescaling and resizing before presenting the resized cropped images to the second CNN model.

17. The non-transitory computer-readable medium of claim 15, wherein the software when executed further:
receives an image captured from one or more imaging devices;
provides the image to the first and second CNN models;
provides the automatically recognized one or more attributes to the one or more imaging devices; and
receives a confirmation that at least one of the one or more attributes was correctly recognized by the first and second CNN models.

18. The non-transitory computer-readable medium of claim 15, wherein the software when executed further:
receives a confirmation that at least one of the one or more attributes was correctly recognized by the first and second CNN models, the confirmation indicating the at least one of the one or more attributes is approved; and
in response to receiving the confirmation, adds the image and the at least one of the one or more approved attributes to the training images.

19. The non-transitory computer-readable medium of claim 15, wherein the software when executed further:
generates product placeholders comprising a set of assigned attributes for a candidate product.

20. The non-transitory computer-readable medium of claim 15, wherein the software when executed further:
synchronizes a set of product placeholders created from images captured by one or more imaging devices; and
prepopulates the set of product placeholders with attributes recognized by the first and second CNN models.

* * * * *